United States Patent [19]

Schliemann

[11] Patent Number: 5,184,403
[45] Date of Patent: Feb. 9, 1993

[54] MOTOR-DRIVEN CHAIN SAW HAVING A LUBRICATING OIL PUMP

[75] Inventor: Harald Schliemann, Waiblingen, Fed. Rep. of Germany

[73] Assignee: Andreas Stihl, Waiblingen, Fed. Rep. of Germany

[21] Appl. No.: 846,132

[22] Filed: Mar. 5, 1992

[30] Foreign Application Priority Data

Mar. 6, 1991 [DE] Fed. Rep. of Germany ....... 4107110

[51] Int. Cl.⁵ .................. B23D 59/04; B23D 57/02; B26D 7/08
[52] U.S. Cl. .................................. 30/123.4; 30/382; 83/169
[58] Field of Search .................. 30/122, 123.3, 123.4, 30/381, 382; 83/169

[56] References Cited

U.S. PATENT DOCUMENTS

| | | | |
|---|---|---|---|
| 3,865,213 | 2/1975 | McDermott | 83/169 |
| 4,353,163 | 10/1982 | Overbury et al. | 30/123.4 |
| 4,636,147 | 1/1987 | Schweitzer et al. | 30/123.4 |
| 4,651,423 | 3/1987 | Grogan | 30/382 |
| 4,683,660 | 8/1987 | Schurr | 30/382 |
| 4,753,012 | 6/1988 | Schurr | 30/382 |
| 4,819,332 | 4/1989 | Sugihara et al. | 30/123.4 |
| 4,847,999 | 7/1989 | Nagashima | 30/123.4 |

Primary Examiner—Douglas D. Watts
Assistant Examiner—Paul M. Heyrana, Sr.
Attorney, Agent, or Firm—Walter Ottesen

[57] ABSTRACT

The invention is directed to a motor-driven chain saw having a drive motor which drives a saw chain via a sprocket with the saw chain running around the periphery of the cutter bar in a guide groove formed in this periphery. A brake device is provided to bring the saw chain to standstill which is actuated by a brake lever. In addition, the drive motor continuously drives a lubricating-oil pump which is mounted in a feed line between the supply tank and a outlet opening of the guide groove. The supply of lubricating oil is interrupted when the saw chain is brought to standstill. This is achieved by providing a blocking valve in the feed line which is closed during idle operation of the drive motor and is opened during load operation of the drive motor.

11 Claims, 3 Drawing Sheets

MOTOR-DRIVEN CHAIN SAW HAVING A LUBRICATING OIL PUMP

BACKGROUND OF THE INVENTION

U.S. Pat. No. 4,636,147 discloses a chain saw having a lubricating oil pump. The pump piston of this lubricating oil pump is moved by means of a control member which lies against a stroke cam of the pump piston. The pump piston is axially reciprocated by the rotation thereof. If it is not necessary to pump the lubricating oil, then the control member is manually lifted from the stroke cam so that the pump piston can no longer undergo any pumping movement thereby interrupting the pumping action of the lubricating oil pump.

The lubricating oil pump is switched on during the operation of the saw chain since lubrication of the saw chain running in the guide groove is then desired. Because of the continuous operation of the oil pump, this leads to the condition that the oil pump continues to pump oil into the guide groove even during idle when the saw chain is at standstill so that excess oil is expelled in an uncontrolled manner.

SUMMARY OF THE INVENTION

It is an object of the invention to improve a chain saw having a lubricating oil pump in such a manner that the lubricating oil is pumped into the guide groove only when the saw chain is running.

The motor-driven chain saw of the invention includes: a motor; a housing for accommodating the motor therein; a cutter bar mounted on the housing and defining a peripheral guide groove; a saw chain mounted in the guide groove; sprocket means operatively connected to the motor for driving the saw chain around the cutter bar; a device for bringing the saw chain to standstill and including a trigger element displaceable between a stop position wherein the saw chain is at standstill and a go position wherein the saw chain moves along the guide groove; a lubricating oil system including: a supply tank for storing lubricating oil; the guide bar having an outlet opening formed therein for discharging the lubricating oil into the guide groove; a feed line connecting the supply tank to the discharge opening; an oil pump connected into the feed line between the supply tank and the discharge opening; the oil pump having an intake connection for taking in the lubricating oil flowing from the supply tank and a discharge opening for discharging the lubricating oil toward the outlet opening; drive means connecting the oil pump to the motor for driving the oil pump continuously while the motor operates; a blocking valve unit having a valve member movably mounted in the feed line for movement between a block position wherein the flow of lubricating oil through the feed line is blocked and a pass position wherein the valve member is withdrawn to allow the lubricating oil to flow through the feed line to the outlet opening; and, connecting means for connecting the valve member to the trigger element so as to cause the valve member to be in the block position when the trigger element is in the stop position and so as to cause the valve member to be in the pass position when the trigger element is in the go position.

During idle operation (when the saw chain is at standstill), the blocking valve unit is closed so that the feed line from the supply tank to the outlet opening of the guide groove is interrupted. A pumping of lubricating oil to the guide groove does not take place. When the saw chain is running (that is during full load), the blocking valve unit is immediately opened so that the pumping of lubricating oil to the outlet opening of the guide groove is again resumed. In this way, it is ensured that lubricating oil is only then pumped into the guide groove when this is necessary because of a running saw chain.

It is advantageous to mount the blocking valve unit at the intake side of the oil pump so that only the suction pressure acts on the valve unit. However, it can be advantageous to mount the valve unit at the discharge side of the oil pump.

According to a further advantageous embodiment of the invention, the blocking valve unit is position-coupled directly to the throttle lever of the drive motor. It is advantageous to couple the blocking valve unit to the brake lever of the brake device.

The blocking valve unit itself comprises a valve housing which is seated in a sealtight manner in a holding space. The feed line and the intake connection or the discharge connection of the oil pump open into this holding space. Bores are provided in the valve housing for connecting the intake connection or discharge connection and the feed line to a valve chamber. If the valve housing is itself configured as a sealing body, then by seating the sealing body in the holding space, the necessary sealing of the guide passage of the lubricating oil from the feed line to the intake connection via the valve chamber is obtained. The sealing body preferably is made of elastic material such as rubber.

It is especially advantageous to configure the valve chamber as a holding cylinder for the valve member configured as a slide piston. A plurality of sealing edges lying one behind the other in the axial direction of the holding cylinder is obtained by an appropriate configuration of the inner contour of this holding cylinder. The sealing edges on the one hand ensure a sealing of the slide piston with respect to the ambient while, on the other hand, they provide an adequate sealing separation between the feed line and the intake connection when the slide piston is driven into the holding cylinder.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
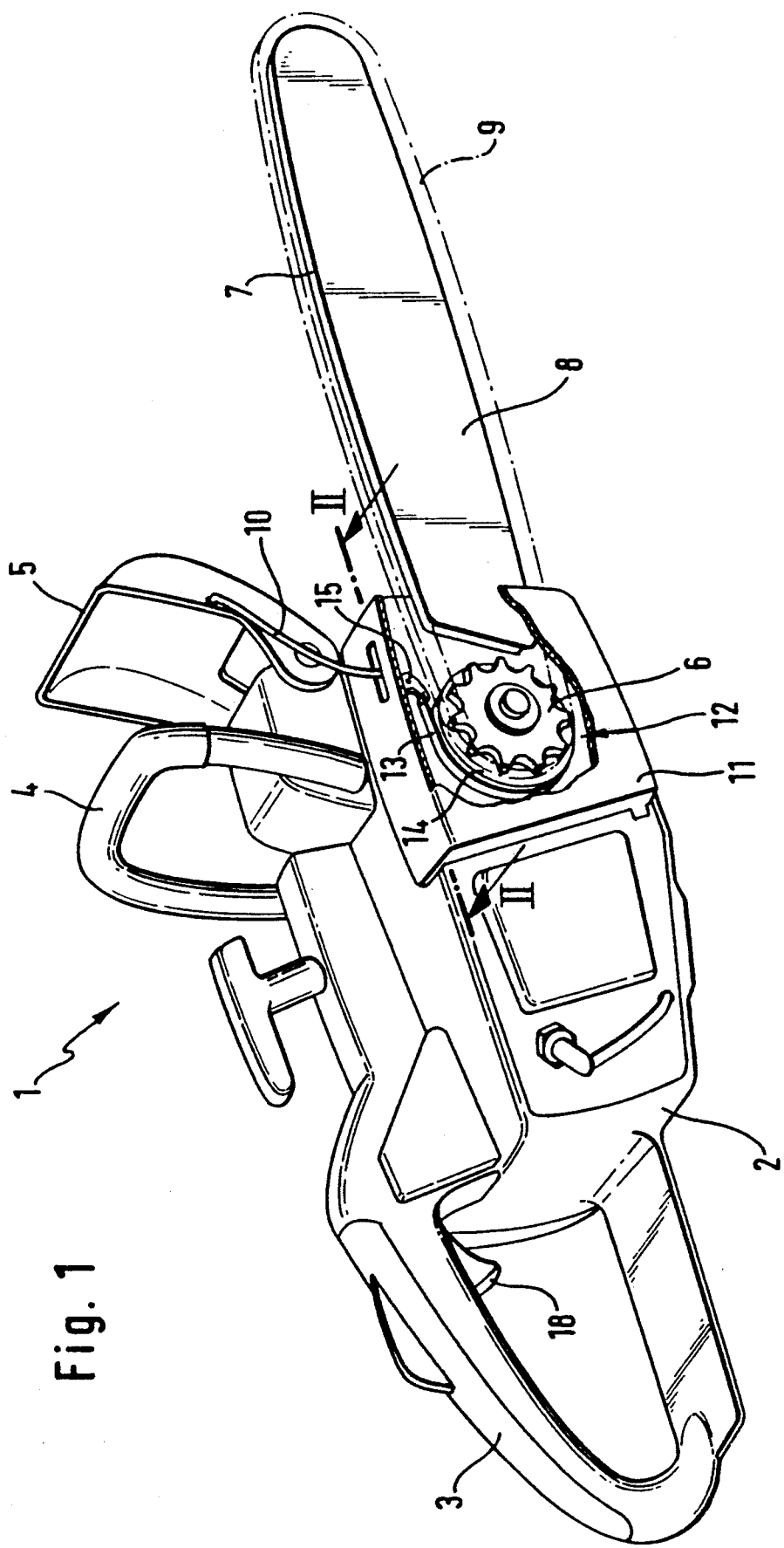
FIG. 1 is a perspective schematic view of a motor-driven chain saw.

The motor-driven chain saw shown in FIG. 1 includes a housing 2 in which a drive motor such as an internal combustion engine is mounted. The housing is provided with a rear handle 3 and front handle 4 with a guard shield 5 being mounted ahead of the front handle. The guard shield 5 is connected via a linkage 10 to a trigger which actuates a brake device 12 via a brake lever. The saw chain is guided in a guide groove during movement around the cutter bar and the brake device 12 operates to bring the saw chain 9 to standstill. The drive motor is not shown in greater detail and drives a sprocket 6 via a centrifugal clutch with the sprocket 6 driving the saw chain 9. The sprocket 6 is connected to the drum 14 so as to rotate fixedly therewith. The drum 14 defines on the one hand, the clutch drum for the centrifugal clutch and, on the other hand, the brake drum 14 for the brake device 12. A brake band 13 coacts with the brake drum 14 with the brake band 13 extending over the periphery of the brake drum 14 and is applied via a brake lever 15 (FIGS. 3 and 4) to the brake drum 14 for bringing the saw chain 9 to standstill. The brake device 12 and the sprocket 6 are disposed below a sprocket cover 11 which is attached to the housing of the chain saw with the aid of threaded fasteners.

Figure 2:
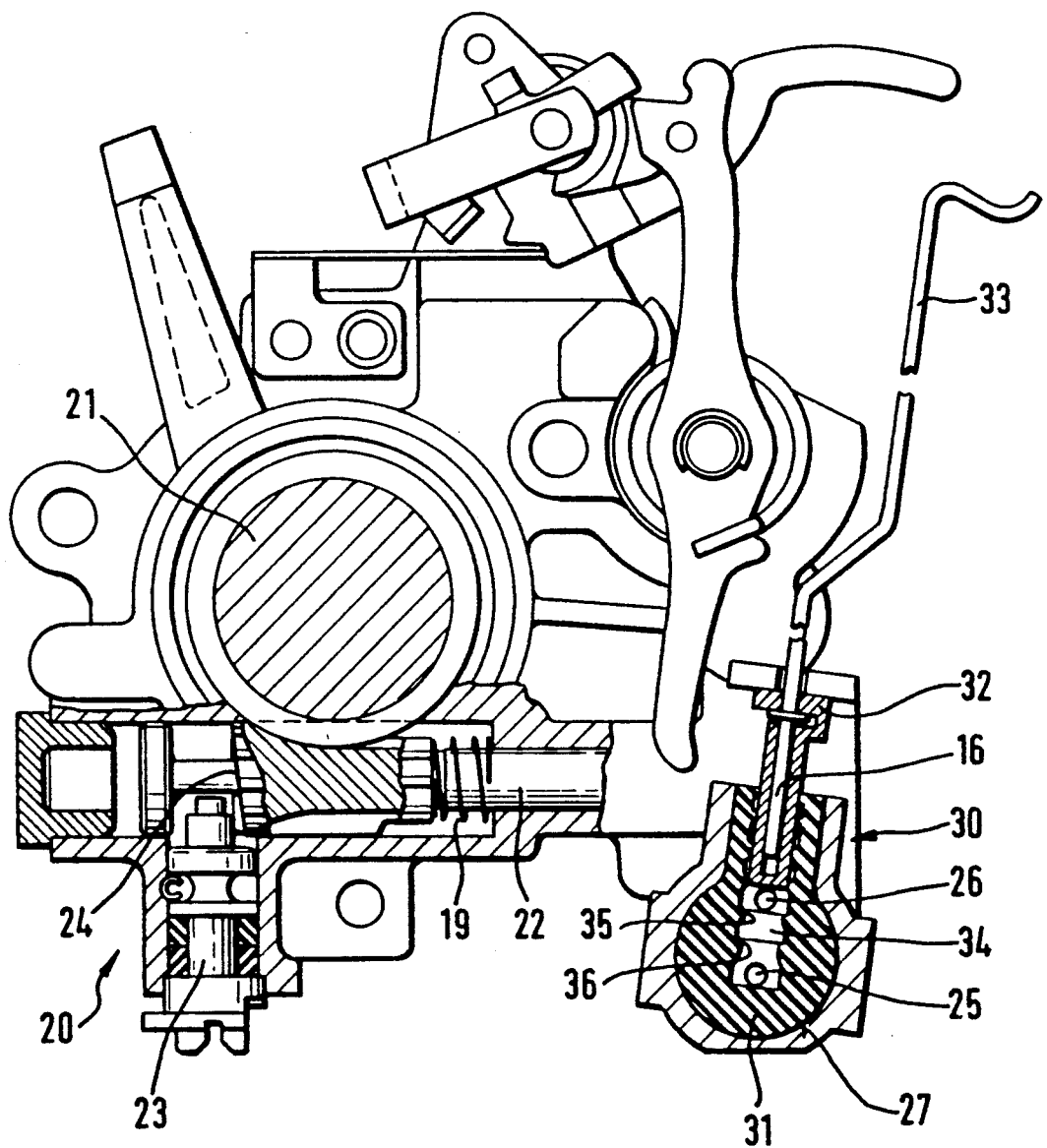
FIG. 2 is a schematic representation of the chain saw of FIG. 1 taken along line II—II of FIG. 1.
Figure 3:
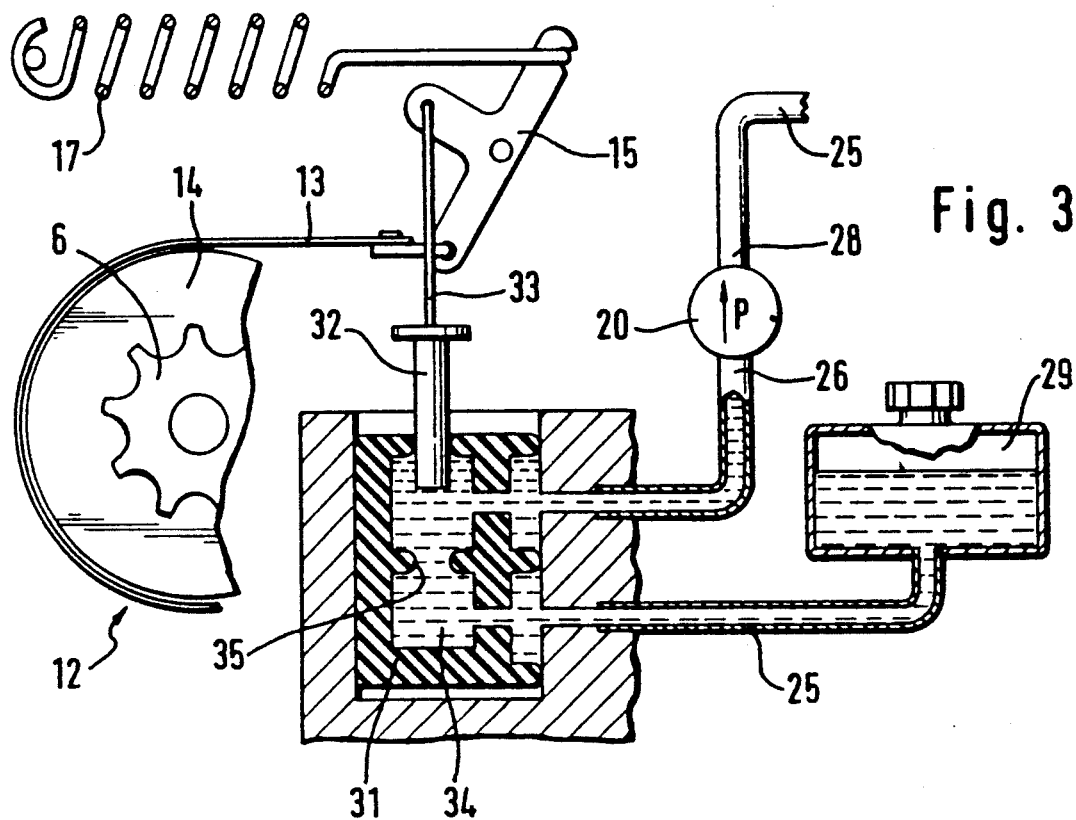
FIG. 3 is a schematic representation of a blocking valve unit on an oil pump according to an embodiment of the invention; and, FIG. 4 is a schematic showing the valve of FIG. 3 in its blocked position.

A lubricating oil pump (FIG. 2) 20 is mounted in the housing between the centrifugal clutch and the drive motor with the pump being continuously driven by the drive motor. Such a lubricating oil pump is disclosed in published German patent application 3,721,643 and includes a pump piston 22 driven by a cam 21 with the pump stroke of the piston 22 being preset via an adjusting element 23. The adjusting element 23 lies in contact engagement with the stroke cam 24 of the pump piston 22 and effects, during rotation of the pump piston 22, the axial pumping movement of the piston against the force of a spring 19. The pump chamber is not shown in greater detail in FIG. 2 and is connected via an intake connection 26 and a feed line 25 to a lubricating oil supply tank 29 (FIG. 3). The pumped lubricating oil is supplied to the guide groove 7 in the cutter bar 8 via the discharge connection of the pump 20 in order to lubricate the saw chain 9 which runs about the periphery of the cutter bar.

A blocking valve 30 is mounted between the feed line 25 and the intake connection 26 and has a valve housing 31 seated in a receiving space 27 of the housing. The housing provides the channels for the feed line 25 and for the intake connection 26. The feed line 25 and the intake connection 26 open into a valve chamber 34 within the valve housing 31. The valve chamber 34 is a receiving cylinder for a valve member configured as a slide piston 32. The slide piston 32 is attached at the free end 16 of an actuating rod 33. The other end of the actuating rod 33 is preferably hooked into the brake lever 15 as shown in FIGS. 2 and 3. The slide piston 32 is configured as a bushing in the embodiment shown into which the free end of the actuating rod 33 is axially seated so that it cannot separate from the slide piston 32. However, it can be sufficient to utilize the free end of the actuating rod 33 itself as a slide piston.

The valve housing 31 is advantageously made of an elastic material such as rubber so that it itself carries out a sealing function. In this way, a sealtight insert in the receiving space 27 of the housing is ensured while at the same time obtaining a liquid-tight connection of the valve chamber 34 to the feed line 25 and to the intake connection 26. The plunging slide piston 32 is guided in a sealtight manner in the elastic valve housing 31 so that no special sealing measures for sealing with respect to the ambient are necessary.

It is advantageous to provide a tree-like inner contour for the valve chamber 34 for obtaining a high sealing effect of the valve chamber 34 configured as a space for the cylinder. With this inner contour, several sealing edges are formed which lie one behind the other in the axial direction of the receiving cylinder and ensure a good seal. The valve chamber 34 is provided with three to four ring-shaped sealing edges disposed axially one behind the other. These sealing edges are in contact engagement with the piston 32 and seal the same with respect to the ambient. The feed line 25 and the intake connection 26 open with axial spacing into the cylindrically-shaped valve chamber 34. At least one further ring-shaped sealing edge 35 (and preferably two sealing edges 35 and 36) is provided axially between the feed line 25 and the intake connection 26.

During load operation of the drive motor (FIG. 3), the brake device 12 is released so that the sprocket 6 is driven via the centrifugal clutch and the saw chain 9 runs in the guide groove 7 about the periphery of the cutter bar. In this position of the brake lever 15, the slide piston 32 is axially withdrawn from the valve chamber 34 so that the feed line 25 and the intake connection 26 of the lubricating oil pump 20 are connected to each other. Lubricating oil is supplied via the discharge connection 28 to the guide groove.

When the brake device 12 is actuated, the brake lever 15 pivots under the action of the brake spring 17 and applies the brake band 13 to the brake drum 14 in order to thereby bring the sprocket 6 and therefore the saw chain 9 to standstill. Because of the pivot movement of the brake lever 15 in the counterclockwise direction, the slide piston 32 plunges into the valve chamber 34 and rides over the sealing edge 35 between the feed line 25 and the intake connection 26 whereby the feed line 25 is separated from the intake connection 26. The oil pump 20 no longer draws lubricating oil from the supply tank 29 and the pumping action of the lubricating oil to the guide groove 7 is interrupted.

Figure 4:
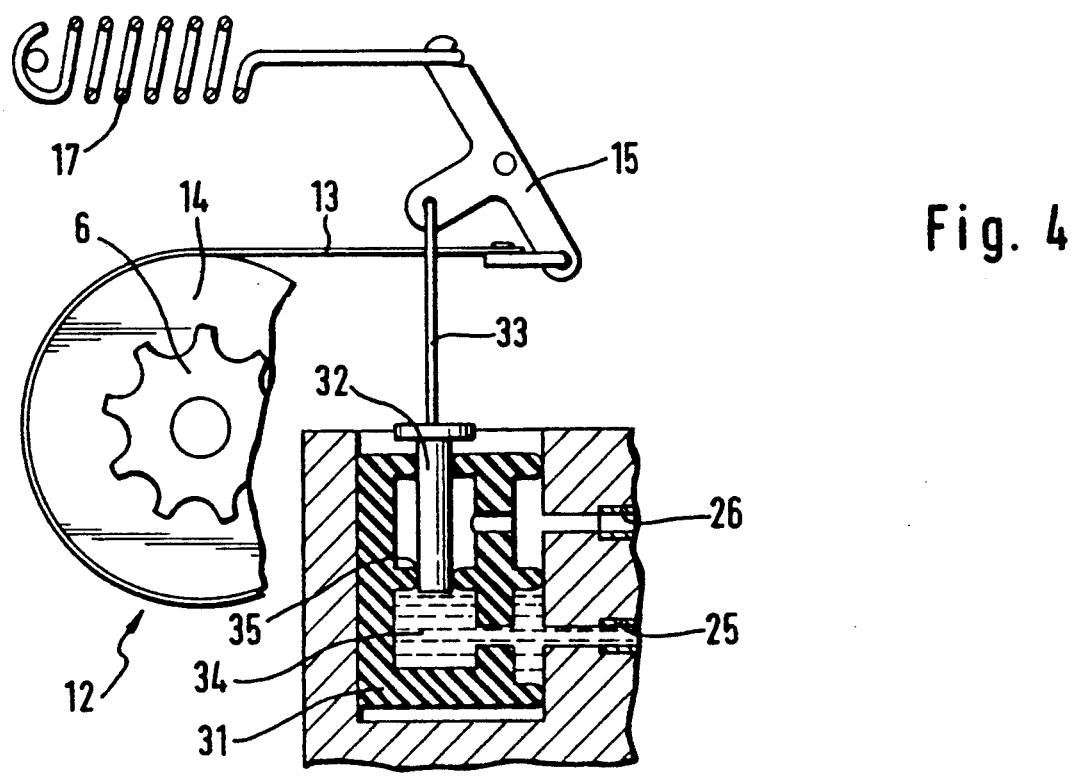

As shown in the embodiment of FIGS. 3 and 4, the linkage 33 can be advantageously coupled to the brake lever 15 of the brake device 12 so that, whenever the saw chain is brought to standstill and lubrication is no longer needed, the feed of the lubricating oil is interrupted. The brake device 12 can, on the one hand, be released during a kickback condition of the motor-driven chain saw or, for the case of a two-handle arrangement, always then go into operation when the operator releases the grip on the rear handle 3 or on the front handle 4. Release mechanisms of this kind are shown, for example, in U.S. Pat. Nos. 4,753,012 and 4,683,660.

It can also be advantageous to couple the linkage 33 of the slide piston 32 with the throttle lever 18 (FIG. 1). In the idle position of the throttle lever 18, the slide piston 32 is displaced into the idle position shown in FIG. 4, for example, via a directional-change lever. If the throttle lever 18 is depressed, then the slide piston is removed axially from the valve chamber 24 via the linkage 33 and passes over the sealing edge 35 so that the intake connection 26 is again connected to the feed line 25.

It is understood that the foregoing description is that of the preferred embodiments of the invention and that various changes and modifications may be made thereto without departing from the spirit and scope of the invention as defined in the appended claims.

What is claimed is:

1. A motor-driven chain saw comprising:
   a motor;
   a housing for accommodating said motor therein;
   a cutter bar mounted on said housing and defining a peripheral guide groove;
   a saw chain mounted in said guide groove;

sprocket means operatively connected to said motor for driving the saw chain around said cutter bar;

a device for bringing the saw chain to standstill and including a trigger element displaceable between a stop position wherein said saw chain is at standstill and a go position wherein said saw chain moves along said guide groove;

a lubricating oil system including:

a supply tank for storing lubricating oil;

said guide bar having an outlet opening formed therein for discharging the lubricating oil into the guide groove;

a feed line connecting said supply tank to said outlet opening;

an oil pump connected into said feed line between said supply tank and said outlet opening;

said oil pump having an intake connection for taking in the lubricating oil flowing from said supply tank and a discharge opening for discharging the lubricating oil toward said outlet opening;

drive means connecting said oil pump to said motor for driving said oil pump continuously while the motor operates;

a blocking valve unit having a valve member movably mounted in said feed line for movement between a block position wherein the flow of lubricating oil through said feed line is blocked and a pass position wherein said valve member is withdrawn to allow the lubricating oil to flow through said feed line to said outlet opening; and, connecting means for connecting said valve member to said trigger element so as to cause said valve member to be in said block position when said trigger element is in said stop position thereby preventing lubricating oil from being discharged through said outlet opening and into said guide groove when said saw chain is brought to standstill by said device and so as to cause said valve member to be in said pass position when said trigger element is in said go position.

2. The motor-driven chain saw of claim 1, said blocking valve unit being connected into said feed line between said supply tank and said intake connection.

3. The motor-driven chain saw of claim 1, said device being a brake device and said trigger element being a brake lever displaceable between a braking position wherein said braking device operates on said sprocket means for bringing said saw chain to standstill and a non-braking release position wherein said saw chain is free to move along said guide groove; and, said connecting means connecting said valve member so as to cause said valve member to be in said block position when said trigger element is in said stop position and so as to cause said valve member to be in said pass position when said trigger element is in said go position.

4. The motor-driven chain saw of claim 1, said trigger element being a throttle lever movable between released and depressed positions, said valve member being connected to said throttle lever so as to move between said block and pass positions so as to be in said block position when said throttle lever is in said released position and to be in said pass position when said throttle lever is in said depressed position.

5. The motor-driven chain saw of claim 1, a receiving space formed in said chain saw; said blocking valve unit including a valve housing seated in a seal-tight manner in said receiving space; said feed line and said intake connection opening into said receiving space; said valve housing defining a valve chamber and having bores formed therein for interconnecting said feed line and said intake connection to said valve chamber.

6. The motor-driven chain saw of claim 5, said valve housing being configured as a sealing body.

7. The motor-driven chain saw of claim 6, said sealing body being made of rubber.

8. The motor-driven chain saw of claim 5, said valve member being a slide piston which is movable into and out of said valve housing.

9. The motor-driven chain saw of claim 8, said valve housing defining a receiving cylinder for receiving said slide piston therein; and, said receiving cylinder having a tree-like inner contour defining sealing edges in contact engagement with said slide piston.

10. The motor-driven chain saw of claim 8, said slide piston being made of plastic.

11. The motor-driven chain saw of claim 8, said slide piston being the elongated end portion of said trigger element.

* * * * *